United States Patent [19]
Doppelfeld et al.

[11] Patent Number: 5,213,717
[45] Date of Patent: May 25, 1993

[54] APPARATUS FOR FUMIGATING WASTE WATERS

[75] Inventors: Wilhelm P. Doppelfeld, Euskirchen; Werner Pieper, Kerpen; Wilhelm Giechau, Hürth; Hilmar Roszinski, Erftstadt, all of Fed. Rep. of Germany

[73] Assignee: Hoechst Aktiengesellschaft, Frankfurt am Main, Fed. Rep. of Germany

[21] Appl. No.: 837,338

[22] Filed: Feb. 14, 1992

[30] Foreign Application Priority Data

Mar. 1, 1991 [DE] Fed. Rep. of Germany ....... 4106527

[51] Int. Cl.$^5$ ............................................. B01F 3/04
[52] U.S. Cl. ................................. 261/93; 261/122.1
[58] Field of Search .................. 261/93, 122.1, 122.2; 239/118, 117, 116

[56] References Cited

U.S. PATENT DOCUMENTS

| | | |
|---|---|---|
| 2,803,826 | 8/1957 | Johnston .............................. 239/118 |
| 3,490,752 | 1/1970 | Danjes et al. ...................... 261/122.2 |
| 3,567,124 | 3/1971 | Jones .................................... 239/118 |
| 3,747,901 | 7/1973 | Coverston ............................ 239/118 |
| 3,759,494 | 9/1973 | Axelrod et al. ....................... 261/93 |
| 3,953,554 | 4/1976 | Loughridge ...................... 261/122.1 |
| 4,925,575 | 5/1990 | Just ........................................ 261/93 |

FOREIGN PATENT DOCUMENTS

| | | |
|---|---|---|
| 2345405 | 8/1977 | Fed. Rep. of Germany . |
| 1231447 | 10/1975 | United Kingdom .................. 261/93 |
| 1445214 | 8/1976 | United Kingdom . |
| 2045632 | 11/1980 | United Kingdom .................. 261/93 |

Primary Examiner—Tim Miles
Attorney, Agent, or Firm—Connolly & Hutz

[57] ABSTRACT

An apparatus is provided for fumigating waste waters in a fumigation tank with fumigation enclosures (gas manifolds which are situated in parallel next to one another and at a distance from one another and rest horizontally, in whose upper sides gas outlet openings are situated and whose undersides are open, wherein mobile rotation bodies rotated by gas flow are situated for cleaning purposes in the gas outlet openings 13 of the fumigation enclosures 14 and the gas outlet openings 13 each have, in a known manner, a central countersunk section 12 enclosing an angle α of, for example, 90 to 180° underneath and the remaining wall thickness 15 of the gas outlet opening 13 of each countersunk section 12 amounts to 0.5 to 2 mm. The rotation body according to the invention may comprise a top section 1 and a base section 3 which are joined to a neck section 2.

15 Claims, 4 Drawing Sheets

APPARATUS FOR FUMIGATING WASTE WATERS

The present invention relates to an apparatus for fumigating waste waters in a fumigation tank with fumigation enclosures which are situated in parallel next to one another and at a distance from one another and rest horizontally, in whose upper sides gas outlet openings are situated and whose undersides are open.

Numerous apparatuses for fumigating waste waters have previously been described in the art.

The direct introduction of oxygen-containing gas via distributor equipment below the surface of the water makes it possible to achieve an effective oxygen transition in the air/water/activated sludge flake three-phase system while at the same time not mechanically impairing the activated sludge flake. When oxygen-containing gas is introduced at the base of deep fumigation tanks to overcome the hydrostatic pressure, suitably designed compressors and technically complex equipment are necessary which can only be operated with high energy consumption, aerosol formation and noise emission.

GB-A-1 445 214 describes a fumigation apparatus in which the oxygen-containing gas is supplied at fairly low pressures and with simply designed fumigation enclosures to the fumigation tank at a fairly shallow depth. The air emerges as fine bubbles via gas outlet openings in the upper side of the fumigation enclosures. Suitable tank shape and tank internals produce, as a result of rising air bubbles, a vertical water flow in which the entire volume of water in the fumigation tank is involved. An intense mixing of the waste water and, consequently, an efficient degradation of organic water constituents are obtained. At the same time, large activated sludge flakes are formed because of the low mechanical loading.

In the aerobic biological degradation of organic ballast substances in calcium-containing waste waters, blockage of the gas outlet openings occurs in this type of fumigation apparatus as a result of the growth of mineral precipitates. This is always the case in those waste waters which are preclarified with lime for the purpose of acid neutralization. In particular, when the carbonate-rich return sludges, which are produced in aerobic biological degradation of organic water ballast substances, and waste water preclarified with lime meet, increased formation of mineral precipitates occurs in the gas outlet openings of the fumigation enclosures. Depending on the composition of the waste water, the gas outlet openings of the fumigation enclosures may be constricted or blocked to such an extent under these conditions within an operating period of a few days that the air no longer emerges as fine bubbles to a sufficient extent and the purification capacity of the fumigation tanks decreases. This then requires the fumigation enclosures to be frequently cleaned of mineral deposits by mechanical or chemical methods. During the cleaning time, the biological purification stage is only available to a limited extent.

The object of the invention is therefore to design the tried and tested apparatus for introducing oxygen-containing gas through fumigation enclosures in such a way that impeding of the emerging air as a result of mineral precipitates no longer occurs and, consequently, the availability of the plant is ensured over long periods of time.

It has been possible to achieve this object, according to the invention, by an apparatus wherein mobile rotation bodies are situated in the gas outlet openings 13 of the fumigation enclosures 14 and the gas outlet openings 13 each have, in a known manner, a central countersunk section 12 enclosing an angle $\alpha$ underneath and the remaining wall thickness 15 of the gas outlet opening 13 of each countersunk section 12 amounts to 0.5 to 2 mm.

The apparatus mentioned can optionally also be developed if a) the rotation body is composed of metal or plastic;
b) the rotation body comprises a top section 1 and a base section 3 which are joined to a neck section 2 and the top section comprises two loops 4 and 4', the axis 8 of the loops 4 and 4' being perpendicular to the axis 7 of the neck section 2 and the plane of the loops 4 and 4' being inclined around the axis 8 by an angle $\beta$, and the base section 3 comprises two bows 6 and 6' which are joined to the neck section 2 and which form an angle $\gamma$ with one another at the neck section 2;
c) the angle $\beta$ is 30 to 60°, in particular 45°;
d) the angles $\gamma$ and $\alpha$ are equally large and more than 90°, but less than 180°, preferably 100 to 130°, in particular 120°;
e) the rotation body can be moved in the quiescent state through 5 to 20 mm, in particular 15 mm, in the gas outlet opening 13 in the direction of the axis 7 of the neck section 2;
f) the rotation body is made of wire having a diameter of 0.5 to 5 mm, in particular of 1 to 1.5 mm;
g) the rotation body is made of sheet-metal strips and preferably has a width of 0.5 to 5 mm, in particular of 1 to 2 mm, and a thickness of 0.1 to 0.5, in particular of 0.2 to 0.3 mm;
h) the loop 4' is constructed as a rod 9 which is situated at right angles to the axis 7 of the neck section 2;
i) the base section 3 is formed from a loop 6" and a rod 10;
j) the loop 6" and the rod 10 form an angle $\gamma$;
k) the projections, in the direction of the axis 7, of the bows 6 and 6' are rotated through 90° with respect to the axis 8;
l) the loop 6" has an axis 11 and the plane formed from the loop 6" is rotated through the angle $\beta$ around the axis 11;
m) the angles of inclination $\beta$ of the loops 4 and 4' around the axis 8 have opposite directions of rotation;
n) the angles of inclination $\beta$ of the loop 4 around the axis 8 and of the loop 6" around the axis 11 have opposite directions of rotation.

The air flow through the gas outlet openings causes the rotation bodies to rotate. As a result, both the countersunk sections and also the remaining wall thickness and the surface around the gas outlet openings are kept free of precipitates. Added to this is also an additional reduction in size of the air bubbles above the gas outlet openings, thereby promoting the fine-bubble nature of the bubbling.

At the same time, it was not immediately obvious to the person skilled in the art that no additional crystallization is initiated with the fumigation apparatus, particularly in the region of the friction surface of the rotation bodies.

The rotation bodies according to the invention are explained in greater detail with reference to the accompanying figures.

Figure 1:
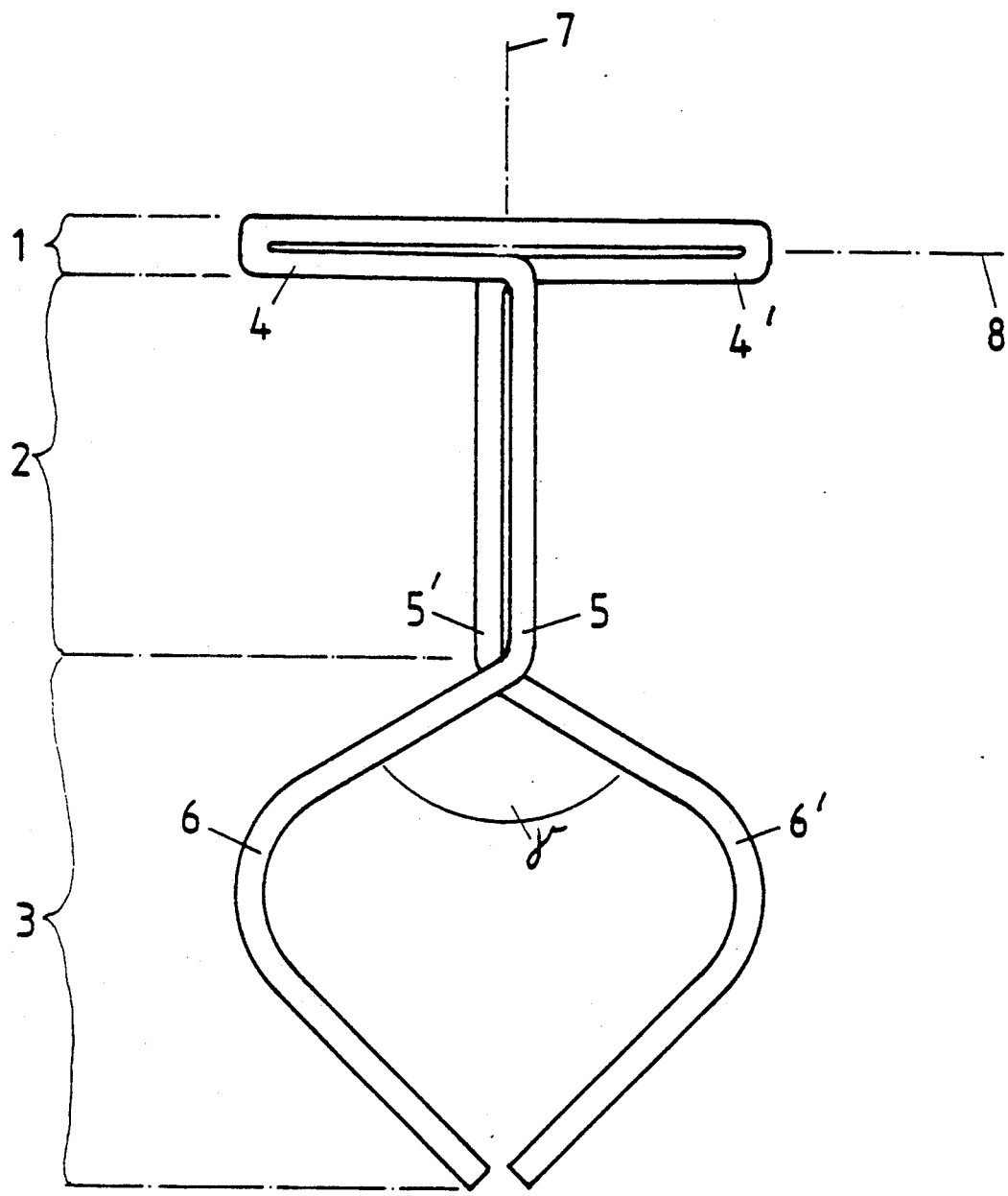
FIG. 1 is a section through the axis of the rotation body with 2 loops.
Figure 2:
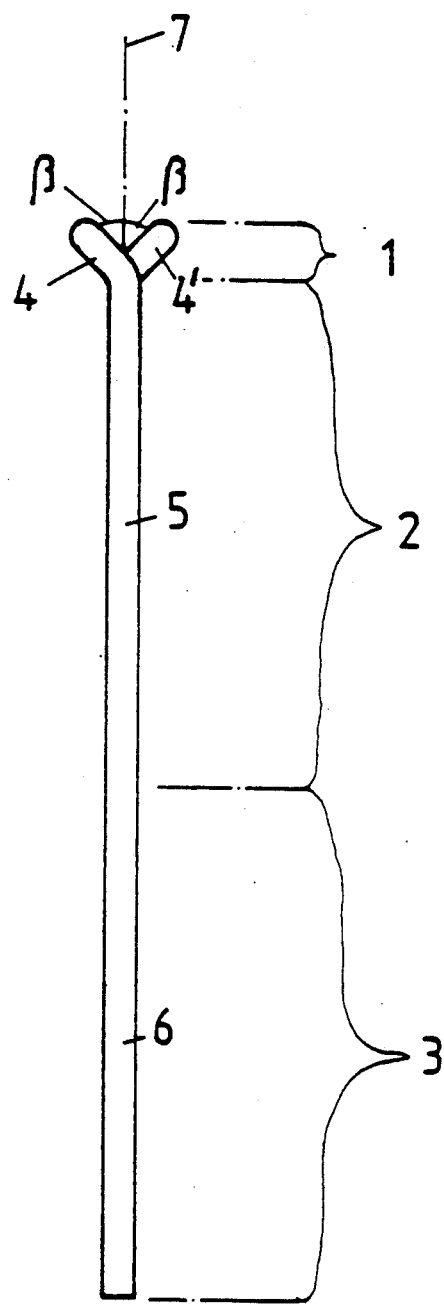
FIG. 2 is a section through the axis of the rotation body, the sections of FIG. 1 and FIG. 2 being rotated through 90° around the axis.

Re FIG. 1 and FIG. 2:

The rotation body with two loops comprises the top section 1, which is formed by the loops 4 and 4'. The top section 1 is joined by means of the rods 5 and 5', which form the neck section 2 having the axis 7, to the base section 3. The loops 4 and 4' are situated around an axis 8 which is perpendicular to the axis 7. The planes framed by the loops 4 and 4' are inclined at the angle $\beta$ around the axis 8. The base section 3 comprises the bows 6 and 6'. The bows 6 and 6' form an angle $\gamma$ at the neck section. The rotation body is pushed into the gas outlet opening 13 from above by compressing the bows 6 and 6'.

Figures 3, 4:
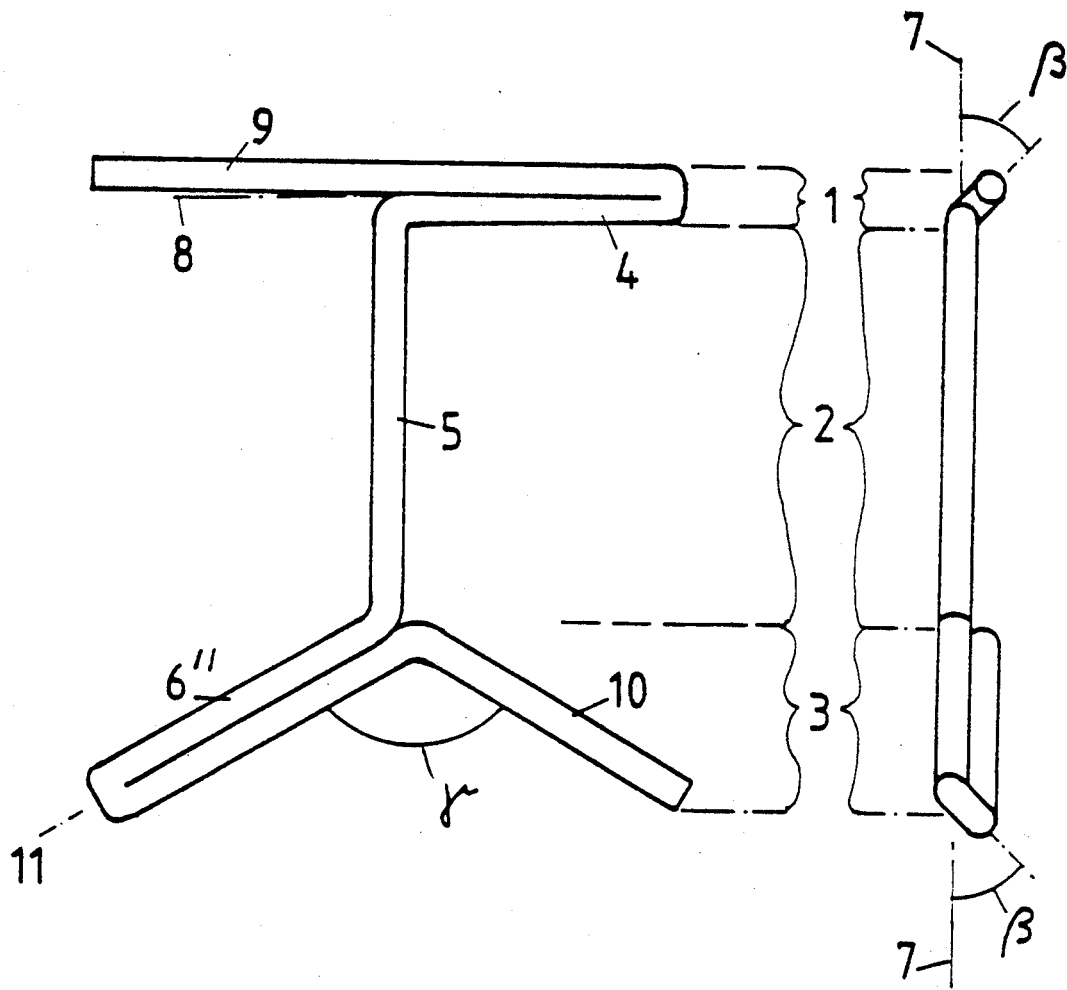
FIG. 3 is a section through the axis of the rotation body with 1 loop in the top section.
FIG. 4 is a section through the axis of the rotation body, the sections of FIG. 3 and FIG. 4 being rotated through 90° around the axis.

Re FIG. 3 and FIG. 4:

In the case of the rotation body having only one loop in the top section 1, the loop 4' is reduced to a rod 9. This rotation body is bent into its final form in situ. At the instant the rotation body is inserted, it comprises the rods 5 and 10 and also the loop 6". After feeding the rod 5 through the gas outlet opening 13 from below, the rod 5 is bent to form the loop 4 and the rod 9. As in the case of the rotation body with two loops, the loop 4 is situated at an angle $\beta$ on the rod 5; the rod 9 is perpendicular to the rod 5. The loop 6" has an axis 11. The plane formed in the loop is inclined at an angle $\beta$ around the axis 11. The loop 6" and the rod 10 form an angle $\gamma$.

Figure 5:
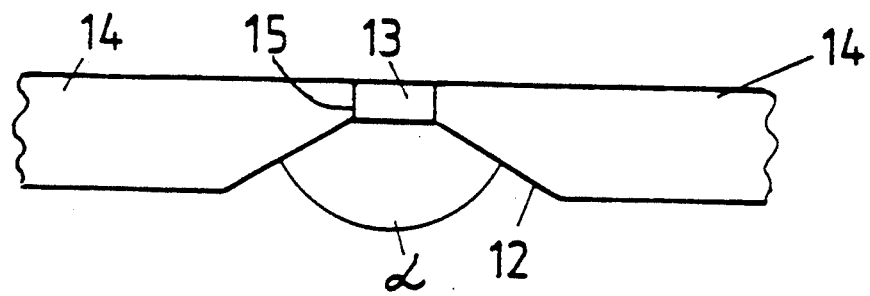
FIG. 5 is a section through the gas outlet opening at the upper side of the fumigation enclosure.

Re FIG. 5:

FIG. 5 shows the gas outlet opening 13 of the fumigation enclosure known from GB-A-1 445 214. Drilled in the upper side of the fumigation enclosure 14 is the gas outlet opening 13 which is enlarged from below by the countersunk section 12 having the angle $\alpha$. In the gas outlet opening 13, the remaining wall thickness 15 is left.

The mode of operation with the rotation bodies according to the invention is indicated in the following examples.

Example 1 (comparison example)

In the central waste water purification plant of a chemical industry site, the waste water is treated in three stages. Mechanical and chemical preclarification with lime produces a prepurified waste water which is fed for the purpose of biological degradation of water ballast substances to an activated sludge plant comprising 6 fumigation tanks with a total tank content of 7500 m³. The mean waste water throughput is 1000 m³/h. The fumigation tanks are equipped with fumigation enclosures and designed for a degradation of 12 tonnes/day of BOD. 4 impellers each inject 30,000 m³/h of air into the system 1 m under the surface of the water using 66 fumigation enclosures in each tank. The fumigation enclosures comprise U-shaped plastic hollow bodies having the opening downward. Enough air is metered into said hollow bodies for the air to be able to emerge as fine bubbles from the gas outlet openings of the fumigation enclosures only through 5 mm drilled holes.

With pHs of 7 to 10 in the fumigation tank, most of the precipitate serves to form the mineral support structure of the activated sludge flakes.

After an operating time of 6 days, most of the gas outlet openings in the fumigation enclosures are largely constricted by mineral precipitates. With increasing blockage of further gas outlet openings the air gushes out of the hollow bodies at the bottom. The bubble pattern of the plant clearly reveals the declining formation of fine air bubbles. With constant loading of the plant with degradable water constituents, the oxygen content in the fumigation tank fell below 1%.

The operational efficiency of the plant was maintained by mechanically and chemically cleaning the fumigation enclosures in a 3-day cycle. This necessitated taking the respective tank out of operation and lowering the water level below the fumigation device, as a result of which no degradation of the water ballast substances took place in this section of the waste water purification system.

EXAMPLE 2

In contrast to Example 1, the gas outlet openings of individual fumigation enclosures are equipped with rotation bodies according to the invention at selected points in a fumigation tank. 2 enclosures are located in the immediate vicinity of the point of confluence of waste water and return sludge and 2 enclosures at the end of the fumigation tank. After operating the waste water purification plant for 2 months, all the fumigation enclosures equipped with rotation bodies are fully operational. The gas outlet openings are free even in the heavily loaded inlet region. The fumigation enclosures were incrusted with mineral deposits. Around the gas outlet openings, circular areas are free of deposits. Only the tracks made by the rotation bodies are visible. Even after an operating period of 6 months, the fumigation enclosure at the outlet of the activated sludge tank equipped with rotation bodies exhibits no incrustations due to mineral precipitates in the region of the running surfaces of the rotation bodies and of the edges of the gas outlet openings.

The rotation body used had two loops and the following dimensions:

| | |
|---|---|
| Mutual spacing of the loop ends | 20 mm |
| Height of the neck section | 15 mm |
| Height of the base section | 18 mm |
| Largest width of the base section | 20 mm |
| Angle $\beta$ | 45° |
| Angle $\gamma$ | 120° |
| V4A wire thickness diameter | 1 mm |

The inside diameter of the gas outlet openings was 5 mm, the upper side had a thickness of 5 mm, the remaining wall thickness was 1 mm and the countersunk section had an angle $\alpha = 120°$.

We claim:

1. An apparatus for fumigating waste waters in a fumigation tank with fumigation enclosures which are situated in parallel next to one another and at a distance from one another and rest horizontally, in whose upper sides gas outlet openings are situated and whose undersides are open, wherein mobile rotation bodies are situated in the gas outlet openings (13) of the fumigation enclosures (14) and the gas outlet openings (13) each have a central countersunk section (12) enclosing an angle $\alpha$ underneath and the remaining wall thickness

(15) of the gas outlet opening (13) of each countersunk section (12) amounts to 0.5 to 2 mm.

2. The apparatus as claimed in claim 1, wherein the rotation body is composed of metal or plastic.

3. The apparatus as claimed in claim 1, wherein the angle $\alpha$ is more than 90°, but less than 180°.

4. The apparatus as claimed in claim 1, wherein the rotation body can be moved in the quiescent state through 5 to 20 mm in the gas outlet opening (13) in the direction of the axis (7) of the neck section (2).

5. The apparatus as claimed in claim 1, wherein the rotation body is made of wire having a diameter of 0.5 to 5 mm.

6. The apparatus as claimed in claim 1, wherein the rotation body is made of sheet-metal strips.

7. The apparatus as claimed in claim 1, wherein the rotation body comprises a top section (1) and a base section (3) which are joined to a neck section (2) and the top section comprises two loops (4) and (4'), the axis (8) of the loops (4) and (4') being perpendicular to the axis (7) of the neck section (2) and the plane of the loops (4) and (4') being inclined around the axis (8) by an angle $\beta$, and the base section (3) comprises two bows (6) and (6') which are joined to the neck section (2) and which form an angle $\gamma$ with another at the neck section (2).

8. The apparatus as claimed in claim 7, wherein the angle $\beta$ is 30 to 60°.

9. The apparatus as claimed in claim 7, wherein the angle $\gamma$ is more than 90°, but less than 180°.

10. The apparatus as claimed in claim 7, wherein the loop (4') is constructed as a rod (9) which is situated at right angles to the axis (7) of the neck section (2).

11. The apparatus as claimed in claim 7, wherein the angles of inclination $\beta$ of the loops (4) and (4') around the axis (8) have opposite directions of rotation.

12. The apparatus as claimed in claim 7, wherein the projections, in the direction of the axis (7), of the bows (6) and (6') are rotated through 90° with respect to the axis (8).

13. The apparatus as claimed in claim 7, wherein the base section (3) is formed from a loop (6") and a rod (10) which include an angle $\gamma$.

14. The apparatus as claimed in claim 13, wherein the loop (6") has an axis (11) and the plane formed from the loop (6") is rotated through the angle $\beta$ around the axis (11).

15. The apparatus as claimed in claim 13, wherein the angles of inclination $\beta$ of the loop (4) around the axis (8) and of the loop (6") around the axis (11) have opposite directions of rotation.

* * * * *